United States Patent [19]

Schwartz

[11] 3,979,960

[45] Sept. 14, 1976

[54] COMPRESSION TESTER

[75] Inventor: Edwin L. Schwartz, Los Angeles, Calif.

[73] Assignee: Rite Autotronics Corporation, Los Angeles, Calif.

[22] Filed: Aug. 25, 1975

[21] Appl. No.: 607,120

[52] U.S. Cl. .................................................. 73/419
[51] Int. Cl.² ........................................... G01L 7/16
[58] Field of Search .............. 73/115, 120, 419, 116

[56] References Cited
UNITED STATES PATENTS 1,430,174   9/1922   Marchus ............................... 73/419

*Primary Examiner*—Donald O. Woodiel
*Attorney, Agent, or Firm*—Robert E. Geauque

[57] ABSTRACT

A compression tester having a rotatably mounted dial disc cooperating with a stationary index line and a piston responsive to compression pressure movable against a spring for rotating the dial disc and a support plate for the dial disc providing for confined movement of the dial disc and low friction resistance to movement.

9 Claims, 6 Drawing Figures

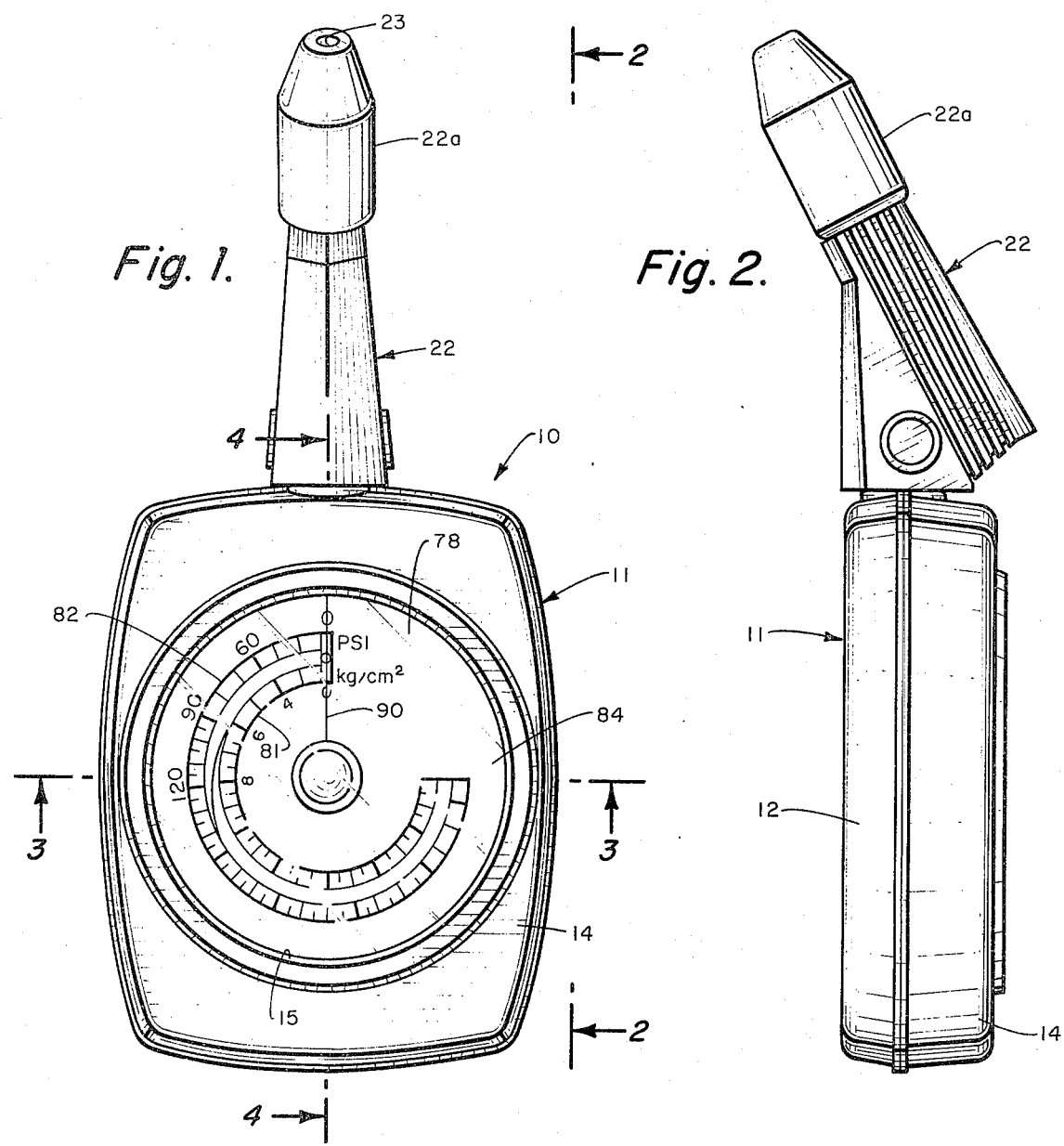
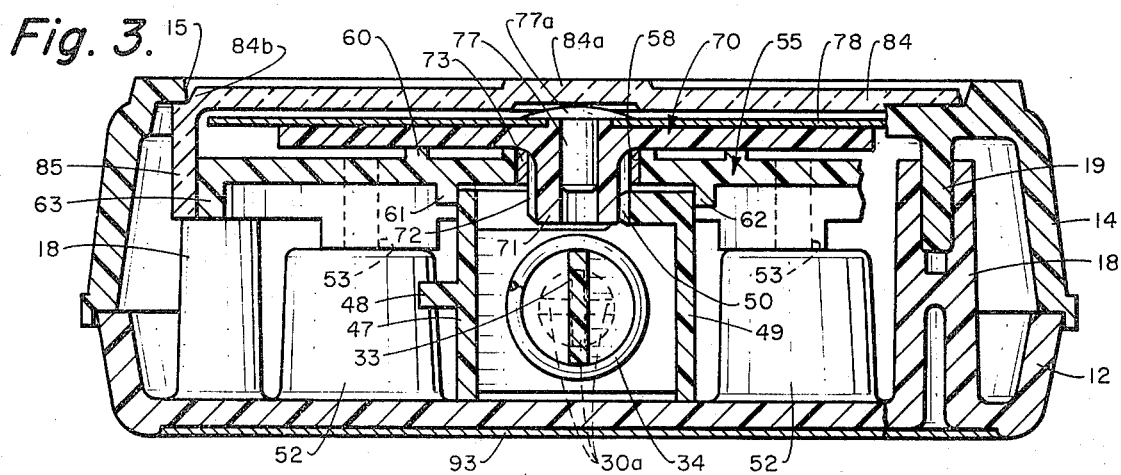

COMPRESSION TESTER

BACKGROUND OF THE INVENTION

The compression pressure produced above the cylinder of an internal combustion engine has been measured by a compression gauge connected to the sparkplug opening in the cylinder above the piston head. After about three compression strokes of the piston, the pressure reading on the gauge will equal that normally in the cylinder and will give a good indication of the condition of the piston rings on the piston head. Various constructions of compression testers have been utilized for this purpose and have used a movable line pointer which moves over a fixed scale mounted on the device. Because of the small area of the pointer, slight changes in pointer position are not easily observed. Also, because of the smallness of the pointer, the tester had to be carefully handled to prevent damage to the pointer.

SUMMARY OF THE INVENTION

The present invention provides a compression tester in which the complete indicator dial, in the form of a dial disc, rotates in response to compression pressure and the line pointer for the dial is stationary on the casing. Changes in the compression pressure in the cylinder cause movement of the entire area of the dial and therefore, changes in pressure will be more noticeable than if the indicator line were the movable element. Since the pointer is fixed to the casing and does not have to be movably supported, a more rugged instrument construction can be utilized and damage to the pointer can be avoided. In the construction of the device, a spring biased piston is responsive to compression pressure and the piston moves a rack which meshes with a gear connected to the indicator dial. Movement of the rack is confined in a track so that the center lines of the piston and spring remain in alignment for all positions of the piston. Also, the movable dial is confined between low friction bearing surfaces so that friction will not measurably effect the reading of the tester. The bearing surface on one side of the dial consists of a ring on a dial support plate and the bearing on the other side of the dial consists of the contact between a rivet head and a cover plate. Thus, the instrument of the present invention is not only more rugged but also provides an instrument which is much easier to read because of the larger moving area of the dial compared with the area of the pointer line.

BRIEF DESCRIPTION OF THE DRAWING

FIG. 1 is a front elevational view of the compression tester showing the rotating indicator dial and the fixed pointer line;

FIG. 2 is a side elevational view along line 2—2 of FIG. 1 illustrating the attachment insertable into the sparkplug hole for sensing compression pressure;

FIG. 3 is a horizontal section along line 3—3 of FIG. 1 illustrating the rotating dial located between the dial support plate and the cover plate;

BRIEF DESCRIPTION OF THE PREFERRED EMBODIMENT

Figure 4:
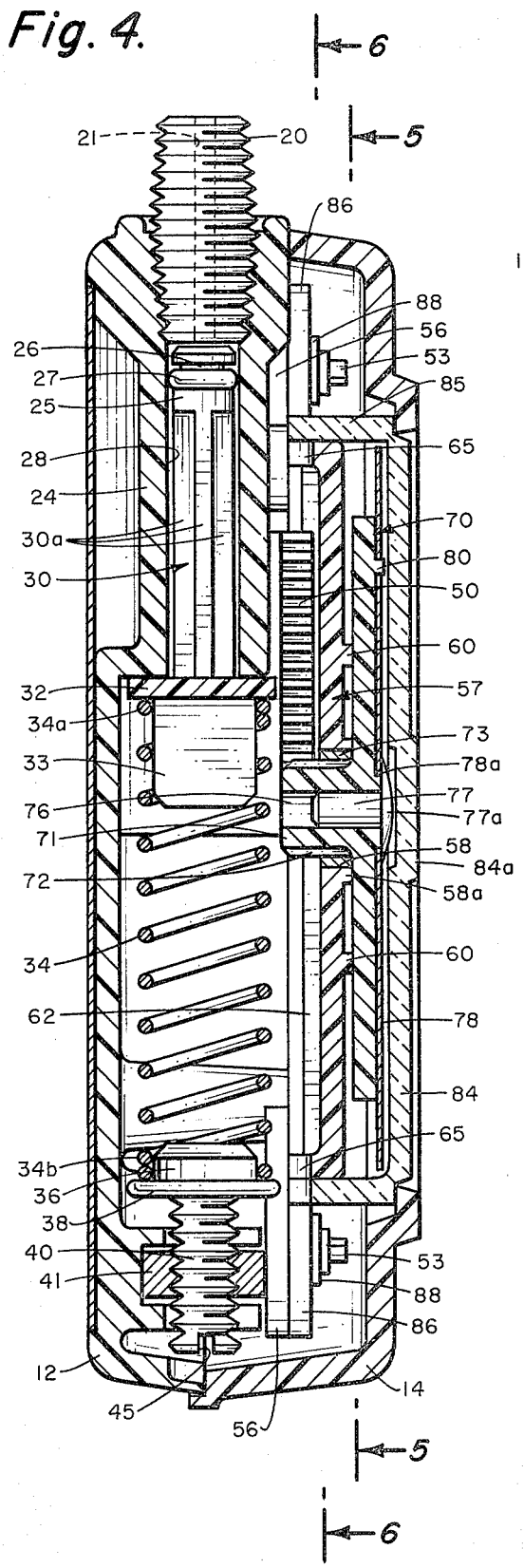
FIG. 4 is a vertical section along line 4—4 of FIG. 1 illustrating the piston and biasing spring.
Figure 5:
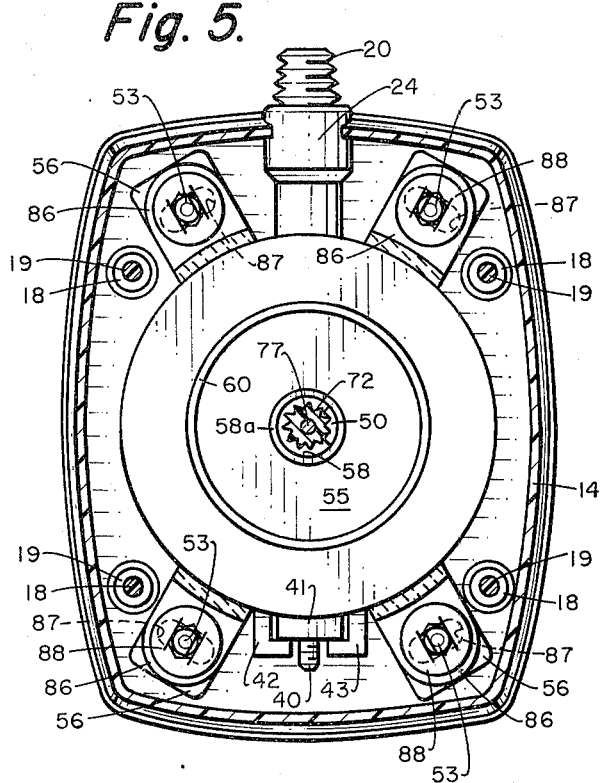
FIG. 5 is a transverse vertical section along line 5—5 of FIG. 4 illustrating the support plate for the rotating indicator disc.

The compression tester 10 has a casing 11 which consists of a bottom portion 12 and top portion 14 which contains an opening 15 covered by a transparent cover 84 through which dial disc 78 can be observed. Four spaced posts 18 are molded integrally with the bottom portion 12 and each post snugly receives a projection 19 from top casing portion 14 in order to secure the casing portions together. A fitting 20 contains passage 21 and is threaded into base portion 12 and into an attachment 22 which is utilized to transmit the pressure from the cylinder. The attachment 22 has a rubber end 22a which fits snugly into a sparkplug opening and contains a passage 23 which connects with passage 21 in fitting 22.

Cylinder 24 is integral with bottom casing portion 12 and contains piston head 25 which has a central circumferential groove 26 receiving an O-ring 27 to seal against interior bore 28 of cylinder 24. A piston rod 30 extends from piston head 25 through the bore 28 of the cylinder 24 and connects at its end with a movable transverse plate 32. The piston rod has four ridges 30a to provide rigidity and the ridges fit snugly in base 28. A flat projection 33 extends from the plate 32 perpendicular thereto and has a width to snugly receive and position end 34a of coil spring 34. The other end 34b of spring 34 is snugly received and positioned by circular projection 36 extending from larger plate 38. A screw 40 extends from plate 38 through a nut 41 confined within two U-shaped supports 42 and 43 which are molded to the casing bottom portion 12. The end of screw 40 contains a slot 45 for rotating the screw with a screwdriver to adjust the force of spring 34 acting against plate 32 and the movement of piston head 25 (see FIG. 4).

Figure 6:
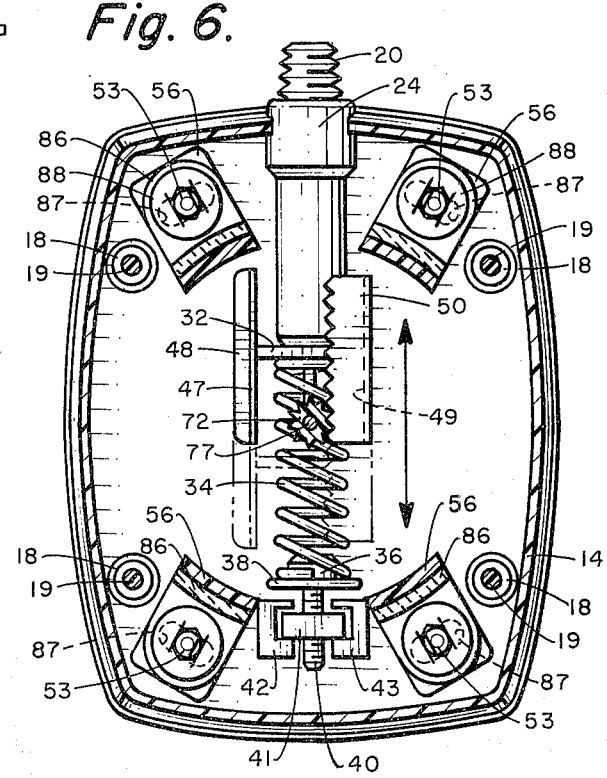
FIG. 6 is a transverse vertical section along line 6—6 of FIG. 4 showing the pinion gear for the rotating dial in mesh with the rack gear.

As illustrated in FIG. 6, the plate 32 is connected on one side to a wall 47 which has an extending outwardly flange 48 and on the other side to a wall 49 which carries rack gear 50 extending inwardly from the wall. The plate 32 and walls 47 and 49 are all moved by piston rod 30 when pressure is introduced to the cylinder bore 28 through passage 21. The piston rod 30 will be moved against the force of spring 34 and the path of movement of gear 50 is illustrated by phantom lines in FIG. 6. The amount of movement by the piston for an increment pressure increase will be determined by the setting of the spring 34 accomplished by the rotation of the screw 40 in the nut 41.

A cylinder 52 is located adjacent each post 18 and a post 53 projects upwardly from each of the four cylinders to approximately the height of the four posts 18. A support plate 55 has four end tabs 56 and each tab has an opening to snugly receive one of the posts 53. Plate 55 also contains a center opening 58 through which rack gear 50 is accessible and the opening is reinforced by lip 58a. The upper surface of the plate 55 contains a circular ridge 60 and the lower surface has straight ridges 61 and 62 depending therefrom (see FIG. 3).

Ridges 61 and 62 confine the upper edges of the plates 47 and 49 and these edges, together with plate 55, require that plates 47 and 49 move adjacent the bottom casing 12 and in a straight line in alignment with the movement of the piston rod 30. Thus, center lines of piston rod 30 and spring 34 are held in alignment by the guide ridges 61 and 62 for the plates 47 and 49, respectively. This assures that calibration of the instrument will be accurate and that the full force of the piston will act in alignment against the spring. A flange 63 extends downwardly from the edge of plate 55 and contains two opposite cut-outs 65 to facilitate gripping of the plate and placing the openings in projections 56 over the posts 53.

A dial plate 70 has a central projection 71 on the surface of which are formed gear teeth to provide a pinion gear 72. A ring 73 surrounds the teeth and this ring is snugly received in opening 58 in support plate 55. The projection 71 contains a center opening 76 into which projects a rivet 77 and the rounded head 77a of the rivet secures the circular disc 78 to the dial plate 70 after insertion of the rivet. The dial plate has a slight upward projection which receives the center opening 78a in metal disc 78 in order to center the disc. Also, plate 70 carries a small pin 80 which projects into a small opening in the disc 78 in order to properly orient the dial disc 78 on the dial plate 70.

As illustrated in FIG. 4, the pinion gear 72 projects through the support plate 55 and meshes with rack gear 50. Movement by the rack gear 50 by the piston 25 will cause rotation of the dial plate 70 and dial disc 78 on which are located the pressure scales 81 and 82. A transparent plastic cover 84 covers the dial disc 78 and has a downward depending flange 85 around its edge from which projects four transparent projections 86, each of which contains an elongated slot 87 to receive a post 53. The length of each slot 87 is such that cover 84 can be rotated somewhat with respect to the dial 78. As illustrated in FIG. 4, the flange 85 of cover 84 surrounds the depending flange 63 of support plate 55 so that the cover 84 is concentrically positioned with respect to the dial plate 70 and the dial disc 78. Projections 86 of the cover 84 overlie projections 56 of the support plate 55 and both projections are secured against the upper surface of cylinder 52 by means of a lock washer 88 forced down over the post 53. Thus, both the support plate 55 and the cover 84 are securely fastened to the posts 53 which are integral with the casing bottom portion 12. An index line 90 is marked on the cover 84 and when gear 72 is in mesh with rack 50, the index line 90 can be aligned with zero pressure in scales 81 and 82 because of the presence of slots 87, before the locker washers are forced into the posts 53.

The cover 84 has a central raised section 84a which is frosted and this section is opposite the head 77a of the rivet 77. The center section 84a and the circular ridge 60 on support plate 55 prevent the dial plate 70 from moving in opposite directions and therefore maintain pinion gear 72 in mesh with rack 50. During movement of the dial plate 70, the back surface is supported by low friction ridge 60 and the movement of the dial plate away from the ridge is resisted by a low area, low friction contact between nut head 77a and cover section 84a. After the cover 84 has been assembled, top casing portion 14 is placed over the cover and is centered by the circumferential notch 84b in the cover so that the casing top portion 14 can be forced onto the bottom portion 12 as the projections 19 are forced into the posts 18.

After the compression tester 10 has been assembled, it is calibrated by connecting known pressures with the opening 21 and adjusting the force of spring 34 until the dial disc 78 reads the same as the known pressures. For instance, the tester can be calibrated at 60 and 90 psi to be sure that the instrument reads correctly over this range. A back panel 93 is inserted into the recess in the back of the instrument in order to cover the back surface.

When it is desired to test the compression in an automobile cylinder, end 22a of the fitting 22 is inserted into a sparkplug hole and after about three compression strokes of the engine, the dial 78 will be rotated to indicate below the index line 90 the value of the compression pressure. Since the complete dial 78 rotates and the index line 90 is fixed, there is a large area which moves as a reading is taken and small changes in pressure will be noted by movement of the dial itself. Thus, it is much easier to read changes in pressure than when the dial is stationary and the index line moves as in prior devices. Since the center line of the movement of the piston rod 30 and of the spring 34 are always held in alignment by guides 61 and 62, the spring can be relied upon to provide valid increment readings. The movable dial plate is mounted with a rigid construction which provides for low friction against movement and more resistance to damage than if the index line 90 was movably mounted. To adjust the calibration of the instrument, it is only necessary to remove the top cover 14 in order to obtain access to the adjusting screw 45 and therefore it is easy to maintain the instrument in proper calibration at all times.

What is claimed is:
1. A compression tester for measuring the compression pressure in a cylinder comprising:
 a casing containing a cylinder connected by a passage to the pressure to be measured;
 a piston in said cylinder movable against a spring in response to pressure in said passage;
 a piston rod rigidly connected to said piston and a rack gear rigidly connected to said piston rod;
 guide means rigid with said casing;
 means rigid with said piston rod and guided by said guide means for guiding the movement of said rack gear;
 a rotatably supported dial means having an axial projection comprising a pinion gear in mesh with said rack gear; and
 a stationary index means carried by said casing for coaction with said dial means to measure pressure.
2. A compression tester as defined in claim 1;
 a stationary support plate secured to said casing and having an axial center opening for rotatably supporting said dial means.
3. A compression tester as defined in claim 2;
 stationary cover means over said dial means and containing said index means.
4. A compression tester as defined in claim 3;
 post means rigidly secured to said casing;
 said support plate and cover means having edge projection contain opening receiving said post means and means for securing said projections to said post means.
5. A compression tester for measuring the compression pressure in a cylinder comprising;
 a casing containing a cylinder connected by a passage to the pressure to be measured;
 a piston in said cylinder movable against a spring in response to pressure in said passage;
 a piston rod connected to said piston and having a first plate rigidly connected to the end of said piston rod for movement therewith;

a rack gear rigidly carried by said first plate and movable with said piston rod;

a dial support plate attached rigidly to said casing and having a central opening therein;

a dial plate having a central projection extending through and rotatably mounted in said central opening said projection having a pinion gear thereon in mesh with said rack gear;

a dial disc secured to the face of said disc plate and having pressure indicating indicia thereon; and a cover for said dial disc secured to said casing and having a stationary index line for cooperating with said indicia to obtain a pressure measurement.

6. A compression tester as defined in claim 5 having a second plate connected to said piston rod and spaced from said first plate; and guide means on one side of said support plate for guiding the movement of both said plates to maintain axial movement of said piston rod.

7. A compression tester as defined in claim 6 wherein said plates are also adjacent said one surface of said support plate to be guided thereby.

8. A compression tester as defined in claim 5;

said dial support plate having a circular ridge on the surface adjacent said dial plate for rotatively supporting said dial plate with low frictional resistance.

9. A compression tester as defined in claim 8 wherein;

said projection contains an axial opening, a rivet inserted into said opening to secure said dial disc to said dial plate;

said rivet having a rounded head adjacent said cover to confine rotational movement of said dial plate between said circular ridge and said cover plate.

* * * * *